(12) United States Patent
Wilzbach et al.

(10) Patent No.: US 11,079,330 B2
(45) Date of Patent: Aug. 3, 2021

(54) FILTER SET, SYSTEM, AND METHOD FOR OBSERVING PROTOPORPHYRIN IX

(71) Applicant: Carl Zeiss Meditec AG, Jena (DE)

(72) Inventors: Marco Wilzbach, Aalen (DE); Christoph Nieten, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 150 days.

(21) Appl. No.: 16/414,805

(22) Filed: May 17, 2019

(65) Prior Publication Data

US 2019/0353596 A1 Nov. 21, 2019

(30) Foreign Application Priority Data

May 17, 2018 (DE) ...................... 10 2018 111 958.5

(51) Int. Cl.
*G01N 21/64* (2006.01)
*G02B 21/06* (2006.01)
*G02B 21/16* (2006.01)
*G02B 5/20* (2006.01)

(52) U.S. Cl.
CPC ..... *G01N 21/6458* (2013.01); *G01N 21/6447* (2013.01); *G01N 21/6486* (2013.01); *G02B 5/208* (2013.01); *G02B 21/06* (2013.01); *G02B 21/16* (2013.01)

(58) Field of Classification Search
CPC ........... G01N 21/6458; G01N 21/6447; G01N 21/6486; G01N 21/06; G01N 21/16; G02B 5/208
See application file for complete search history.

(56) References Cited

U.S. PATENT DOCUMENTS

| 6,212,425 | B1 | 4/2001 | Irion et al. |
| 6,640,131 | B1 * | 10/2003 | Irion ..................... A61B 5/0071 |
| | | | 600/109 |
| 2004/0152987 | A1 * | 8/2004 | Haisch ............... G01N 21/6428 |
| | | | 600/473 |
| 2010/0044583 | A1 * | 2/2010 | Steffen ................. A61B 5/0059 |
| | | | 250/458.1 |

(Continued)

FOREIGN PATENT DOCUMENTS

| DE | 19548913 A1 | 7/1997 |
| DE | 102010033825 A1 | 2/2012 |

OTHER PUBLICATIONS

Semrock 2017 Master Catalog, 2017, pp. 1-108.
(Continued)

*Primary Examiner* — Blake C Riddick
(74) *Attorney, Agent, or Firm* — Falk Ewers; Ewers IP Law PLLC

(57) ABSTRACT

A filter set for simultaneously observing fluorescent and non-fluorescent object regions, and an observation system and a method in which the filter set is used are disclosed. The illumination and observation light filters of the filter set each have two separate passbands with high transmission, which are spectrally defined such that illumination light outside the emission spectrum of fluorescence can pass through the illumination and observation light filters and fluorescent light is not swamped by the illumination light. The transmission of the passbands is defined such that non-fluorescent object regions can be observed substantially with color fidelity.

21 Claims, 3 Drawing Sheets

(56) References Cited

U.S. PATENT DOCUMENTS

| | | | |
|---|---|---|---|
| 2010/0110538 A1* | 5/2010 | Steffen | G02B 21/16 |
| | | | 359/363 |
| 2010/0261965 A1* | 10/2010 | Beck | A61B 5/0071 |
| | | | 600/160 |
| 2011/0149084 A1* | 6/2011 | Beck | A61B 1/0646 |
| | | | 348/187 |
| 2012/0248333 A1* | 10/2012 | Fallert | A61B 1/0638 |
| | | | 250/458.1 |
| 2012/0300294 A1 | 11/2012 | Jess et al. | |
| 2015/0346098 A1* | 12/2015 | Hauger | G01N 21/6458 |
| | | | 359/389 |
| 2016/0286197 A1* | 9/2016 | Schwarz | A61B 90/361 |
| 2017/0234796 A1* | 8/2017 | Kuster | A61B 1/0646 |
| | | | 359/350 |
| 2017/0235118 A1* | 8/2017 | Kuster | G01N 21/6458 |
| | | | 600/476 |
| 2018/0242848 A1* | 8/2018 | Dacosta | A61B 5/01 |

OTHER PUBLICATIONS

Office Action by the German Patent and Trademark Office, with translation thereof, for counterpart application No. 10 2018 111 958.5 dated Jan. 7, 2019.

Office Action by the German Patent and Trademark Office, with translation thereof, for counterpart application No. 10 018 111 958.5 dated Apr. 1, 2019.

* cited by examiner

FILTER SET, SYSTEM, AND METHOD FOR OBSERVING PROTOPORPHYRIN IX

CROSS REFERENCE TO RELATED APPLICATIONS

This application claims priority to German patent application DE 10 2018 111 958.5 filed on May 17, 2018, which is hereby incorporated by reference in its entirety.

TECHNICAL FIELD

The present disclosure relates to a fluorescence observation system, a method for carrying out a fluorescence observation, and a filter set usable for this purpose.

BACKGROUND

Fluorescence observation is used in many fields of technology, biology, and medicine to make different types of structures of an object visible in a manner distinguishable from one another. It is conventional practice to arrange an illumination light filter in a beam path between an illumination light source and the object to be observed, which illumination light filter substantially only allows light to pass through which can excite the fluorescence of a fluorescent dye. An observation light filter is then arranged in a beam path of an observation optical unit, which observation light filter allows fluorescent light to pass through and substantially does not allow light to pass through which the illumination light filter allows to pass through. In an image which is perceived directly by the eye looking into the observation optical unit or which is recorded by a camera via the observation optical unit, fluorescent structures of the object are then perceptible as bright regions, while non-fluorescent structures of the object are dark, such that structures contained therein are not perceptible.

In this case, it is furthermore desirable for the non-fluorescent regions of the object also to be perceptible in the image to be able to better detect the spatial position of the fluorescent structures relative to the non-fluorescent structures. In view of this desire, DE 195 48 913 A1 proposes coordinating transmission characteristics of the illumination light filter and of the observation light filter with one another in such a way that they spectrally overlap in a wavelength range having a width of at most 50 nm, such that the observation light filter allows a small part of the light to pass through which the illumination light filter also allows to pass through. As a result, both the fluorescent structures of the object which emits the fluorescent light and non-fluorescent structures which reflect the light from the wavelength range having a width of 50 nm are visible via the observation light filter.

It has been found that even with such a coordination of the illumination light filter with the observation light filter, non-fluorescent regions of an object are insufficiently perceptible.

SUMMARY

Accordingly, it is an objective of the present disclosure to provide a filter set, a fluorescence observation system, and a method for carrying out a fluorescence observation which enable a better perceptibility of non-fluorescent regions of an object.

First Filter Set

In accordance with exemplary embodiments of the disclosure, an illumination light filter of a first filter set has a transmission characteristic as a function of the wavelength of the light, which transmission characteristic is a sum of a first partial characteristic and a second partial characteristic. The transmission of the first partial characteristic within a first wavelength range, which lies below a limit wavelength, is greater than a first value. The transmission of the second partial characteristic within a second wavelength range, which lies above the limit wavelength, is less than a second value and greater than a third value.

The transmission characteristic of an observation light filter of the first filter set is a sum of a third partial characteristic and a fourth partial characteristic. The transmission of the third partial characteristic within a third wavelength range, which lies above the limit wavelength, is greater than the first value. The transmission of the fourth partial characteristic within a fourth wavelength range, which lies below the limit wavelength, is less than the second value and greater than the third value.

Moreover, the transmission of the illumination light filter within a fifth wavelength range, which lies between the first wavelength range and the second wavelength range, is less than a fourth value; and the transmission of the observation light filter within a sixth wavelength range, which lies between the third wavelength range and the fourth wavelength range, is less than the fourth value.

In this case, the fourth value is less than the third value, the third value is less than the second value, and the second value is less than the first value.

The limit wavelength is a wavelength which is defined depending on the fluorescent dye used and which separates the wavelengths used for the excitation of the fluorescent dye from the wavelengths used for the detection of the fluorescent dye. By way of example, the limit wavelength is chosen in such a way that it is greater than a maximum of the excitation spectrum of the fluorescent dye used and less than a maximum of the emission spectrum of the fluorescent dye used. However, it is also possible to depart from this, and the limit wavelength can be chosen to be less than the maximum of the excitation spectrum or greater than the maximum of the emission spectrum because excitation and emission spectra often overlap extensively in fluorescence processes.

The excitation spectrum of protoporphyrin IX (PPIX) has a maximum at approximately 405 nm. The emission spectrum of PPIX has a maximum at approximately 635 nm and a secondary maximum at approximately 705 nm. Accordingly, the limit wavelength can be chosen to be for example between 405 nm and 635 nm or between 405 nm and 705 nm.

The first partial characteristic of the transmission characteristic of the illumination light filter serves to feed fluorescence excitation light to the object to be examined. Therefore, the first partial characteristic within the first wavelength range has transmission values that are greater than the first value. This means that the transmission of the illumination light filter in the entire first wavelength range is greater than the first value. Accordingly, the first value represents a minimum value for the transmission within the first wavelength range. The first value should be chosen to be as high as possible and is for example 50%, 70%, or 90%. A value of 1.0 may be the target of an optimization here, but this value can be attained only approximately in practice.

The second partial characteristic of the transmission characteristic of the illumination light filter serves to feed to the object a certain amount of light which does not serve for the excitation of fluorescence, but rather for the visualization of non-fluorescent structures of the object. Since this light has wavelengths above the limit wavelength, the light, if it is reflected by the object, can pass through the observation light filter and be perceived, such that non-fluorescent structures of the object can be perceived by way of this light.

Since fluorescent light generated by a fluorescent object usually has a low intensity, it is desirable for an intensity with which non-fluorescent regions of the object can be perceived in a fluorescence image not to be significantly greater than the intensity with which the fluorescent regions are perceived. The fluorescence might otherwise be perceived only poorly on account of swamping by the non-fluorescent regions. Therefore, the amount of light which is fed to the object by way of the second partial characteristic is restricted by the transmission of the illumination light filter in the second wavelength range being less than the second value and greater than the third value. This means that the transmission of the illumination light filter in the entire second wavelength range is less than the second value and at the same time, however, greater than the third value. Accordingly, the second value represents a maximum value for the transmission within the second wavelength range; and the third value represents a minimum value for the transmission within the second wavelength range.

In this case, the second value is less than the first value, such that the maximum transmission in the second wavelength range is (significantly) less than the minimum transmission in the first wavelength range. However, the minimum transmission in the second wavelength range is greater than the third value, which represents a significant transmission and does not represent a transmission which is very low and is attained in regions of the transmission characteristic of the filter in which as far as possible no light is intended to be transmitted. Such transmission values are attained for example between the first wavelength range and the second wavelength range, where the transmission is less than the fourth value, which represents a transmission of the filter in such a way that there as far as possible no light is intended to pass through the filter. The second value is for example 10%, 5%, or 1%. The third value is for example 0.01%, 0.05%, or 0.1%. The fourth value is for example 0.005% or 0.001%, or 0.0001%.

Consequently, the illumination light filter has, in summary, at least the following properties: It is significantly penetrated by light from a plurality of mutually separate wavelength ranges, wherein at least one of the plurality of wavelength ranges is disposed below the limit wavelength and allows a large amount of light to pass through, while at least one other of the plurality of wavelength ranges is disposed above the limit wavelength and allows a comparatively smaller but nevertheless significant amount of light to pass through.

The transmission characteristic of the observation light filter has the third and fourth partial characteristics. The third partial characteristic, above the limit wavelength, has the third wavelength range, within which the transmission has values that are greater than the first value. This means that the transmission of the observation light filter in the entire third wavelength range is greater than the first value. Accordingly, the first value represents a minimum value for the transmission within the third wavelength range. The third partial characteristic serves to allow to pass through both the fluorescent light and light which serves for the perception of non-fluorescent regions and was able to reach the object on account of the second partial characteristic of the illumination light filter. On account of the usually low intensities of fluorescent light, the transmission in the third wavelength range has the highest possible values, i.e., values that are greater than the first value described above. What is achieved as a result is that both fluorescent structures of the object and non-fluorescent structures of the object are perceptible. This is achieved by virtue of the fact that a significant amount of light which does not necessarily serve for fluorescence excitation is fed to the object and is passed together with the fluorescent light through the observation light filter.

The fourth partial characteristic, below the limit wavelength, has the fourth wavelength range, within which the transmission has values that are less than the second value and greater than the third value. This means that the transmission of the observation light filter in the entire fourth wavelength range is less than the second value and greater than the third value. Accordingly, the second value represents a maximum value for the transmission within the fourth wavelength range; and the third value represents a minimum value for the transmission within the fourth wavelength range. The fourth partial characteristic serves to allow light which is not fluorescent light, and which can thus serve for the perception of non-fluorescent objects, to pass through the observation light filter. Since this light is intended not to swamp the fluorescence, the amount of light which can pass through the observation light filter on account of the fourth partial characteristic is restricted by the maximum transmission in the fourth wavelength range being less than the second value, which is significantly less than the first value, which can represent transmissions which are optimized with regard to a maximum transmission. On the other hand, the amount transmitted by the observation light filter below the limit wavelength is intended to be significant, for which reason the transmission in the fourth wavelength range is greater than the third value, which is significantly greater than the fourth value, which describes transmissions which are intended substantially to block passage of light.

In this design, for the observation of non-fluorescent regions of the object, light from at least two different wavelength ranges is available, namely firstly the light which is not fluorescent light and is fed to the object on account of the second partial characteristic of the illumination light filter and is transmitted by the observation light filter on account of the third partial characteristic, and furthermore the light which is fed to the object on account of the first partial characteristic of the illumination light filter and is transmitted by the observation light filter on account of the fourth partial characteristic. These two wavelength ranges for the observation of non-fluorescent regions of the object afford the advantage, on account of their spectral separation, that the non-fluorescent regions do not appear merely in one color. It is possible, rather, to perceive non-fluorescent regions in a plurality of spectral ranges, which, in comparison with perception in one color, leads to an improved recognition of different structures in the non-fluorescent regions of the object.

In this case, it is possible for the second partial characteristic of the illumination light filter and the fourth partial characteristic of the observation light filter in each case to allow the passage of light in a plurality of mutually separate spectral ranges. These spectral ranges can be chosen such that the light then available for observing non-fluorescent regions originates from a plurality of spectral ranges which can be chosen in such a way that this light is mixed to form approximately white light. As a result, a non-fluorescent white area can also be perceived approximately as a white area through the system comprising illumination light filter and observation light filter.

The transmission of the illumination light filter within the fifth wavelength range, which lies between the first wavelength range and the second wavelength range, is less than a fourth value. This means that in the entire fifth wavelength range the transmission of the illumination light filter is less than the fourth value. The fourth value therefore represents a maximum value for the transmission of the illumination light filter within the fifth wavelength range. The transmission of the observation light filter within a sixth wavelength range, which lies between the third wavelength range and the fourth wavelength range, is also less than the fourth value. This means that in the entire sixth wavelength range the transmission of the observation light filter is less than the fourth value. The fourth value therefore represents a maximum value for the transmission of the observation light filter within the sixth wavelength range. This improves the white light impression achieved by means of the first to fourth partial characteristics for non-fluorescent object regions.

For the fluorescent dye PPIX, the transmission characteristics explained above are chosen as follows: The limit wavelength lies in the range of from 450 nm to 550 nm, the first wavelength range lies in the range of from 350 nm to the limit wavelength, the second wavelength range lies in the range of from the limit wavelength to 680 nm, the third wavelength range lies in the range of from the limit wavelength to 800 nm, and the fourth wavelength range lies in the range of from 410 nm to the limit wavelength.

In other words, the first wavelength range extends from a first wavelength to a second wavelength greater than the first wavelength, wherein the first wavelength is greater than or equal to 350 nm and the second wavelength is less than or equal to the limit wavelength.

Stated differently, the second wavelength range extends from a third wavelength to a fourth wavelength greater than the third wavelength, wherein the third wavelength is greater than or equal to the limit wavelength and the fourth wavelength is less than or equal to 680 nm.

Moreover, the third wavelength range extends from a fifth wavelength to a sixth wavelength greater than the fifth wavelength, wherein the fifth wavelength is greater than or equal to the limit wavelength and the sixth wavelength is less than or equal to 800 nm.

In other words, the fourth wavelength range extends from a seventh wavelength to an eighth wavelength greater than the seventh wavelength, wherein the seventh wavelength is greater than or equal to 410 nm and the eighth wavelength is less than or equal to the limit wavelength.

Stated differently, the fifth wavelength range extends from a ninth wavelength to a tenth wavelength greater than the ninth wavelength, wherein the ninth wavelength is greater than the second wavelength and the tenth wavelength is less than the third wavelength.

Moreover, the sixth wavelength range extends from an eleventh wavelength to a twelfth wavelength greater than the eleventh wavelength, wherein the eleventh wavelength is greater than the eighth wavelength and the twelfth wavelength is less than the fifth wavelength.

In accordance with an exemplary embodiment relating to the first filter set, the transmission of the second partial characteristic of the illumination light filter within an eighth wavelength range, which lies outside the second wavelength range but within the third wavelength range, is less than the fourth value. Within the eighth wavelength range, the transmission of the third partial characteristic of the observation light filter is greater than the first value. The very low transmission within the eighth wavelength range of the second partial characteristic blocks light which would swamp fluorescent light from PPIX if it were directed onto the object and reflected by the latter. The high transmission in the observation light filter makes it possible to observe the fluorescent light from PPIX. Moreover, the low transmission in the eighth wavelength range of the illumination light filter is also relevant to achieving an observation of non-fluorescent object regions with color fidelity, since it limits the second wavelength range and the associated significant transmission of the illumination light filter in the second wavelength range.

Second Filter Set

In accordance with exemplary embodiments of the disclosure, a second filter set, which achieves the same effect as the first filter set, comprises an illumination light filter and an observation light filter. The transmission characteristic of the illumination light filter is a sum of a first partial characteristic and a second partial characteristic. The first partial characteristic of the illumination light filter of the second filter set corresponds to the first partial characteristic of the illumination light filter of the first filter set. Accordingly, the transmission of the first partial characteristic within a first wavelength range, which lies below a limit wavelength, is greater than a first value.

The second partial characteristic of the illumination light filter of the second filter set differs from the second partial characteristic of the illumination light filter of the first filter set substantially only in that the transmission of the second partial characteristic within a second wavelength range, which lies above the limit wavelength, is greater than the first value.

The transmission characteristic of the observation light filter of the second filter set is a sum of a third partial characteristic and a fourth partial characteristic. The third partial characteristic of the illumination light filter of the second filter set differs significantly from the third partial characteristic of the illumination light filter of the first filter set. The transmission of the third partial characteristic of the observation light filter of the second filter set within a third wavelength range, which lies above the limit wavelength, is less than a second value and greater than a third value. Moreover, the transmission of the third partial characteristic within a ninth wavelength range, which lies above the third wavelength range, is greater than the first value.

The fourth partial characteristic of the illumination light filter of the second filter set corresponds to the fourth partial characteristic of the illumination light filter of the first filter set. Accordingly, the transmission of the fourth partial characteristic within a fourth wavelength range, which lies below the limit wavelength, is less than the second value and greater than the third value.

As in the case of the first filter set, the transmission of the illumination light filter of the second filter set within the fifth wavelength range, which lies between the first wavelength range and the second wavelength range, is also less than a fourth value.

As in the case of the first filter set, the transmission of the observation light filter within the sixth wavelength range, which lies between the third wavelength range and the fourth wavelength range, is also less than the fourth value.

As in the case of the first filter set, the fourth value is less than the third value, the third value is less than the second value, and the second value is less than the first value.

The first and second filter sets therefore differ insofar as the transmission of the illumination light filter of the first filter set within the second wavelength range is less than the second value but greater than the third value, while the transmission of the illumination light filter of the second filter set within the second wavelength range is greater than the first value.

This difference is compensated for in the observation light filter by virtue of the fact that the transmission of the observation light filter of the first filter set within the third wavelength range is greater than the first value, while the transmission of the observation light filter of the second filter set within the third wavelength range is less than the second value but greater than the third value, wherein the second and third wavelength ranges spectrally overlap in both cases. For the observation of non-fluorescent object regions, substantially the same effect thus arises with both filter sets.

With both filter sets, PPIX can be efficiently excited and the fluorescence resulting therefrom can be observed well because the respective illumination light filters have a low transmission (less than the fourth value) in the emission range of PPIX and the respective observation light filters have a high transmission (greater than the first value) in the emission range of PPIX.

In accordance with an exemplary embodiment of the second filter set, the limit wavelength is between 450 nm and 550 nm. Additionally or alternatively, the first wavelength range can lie between 350 nm and the limit wavelength. Additionally or alternatively, the second wavelength range can lie between the limit wavelength and 680 nm. Additionally or alternatively, the third wavelength range can lie between the limit wavelength and 680 nm. Additionally or alternatively, the ninth wavelength range can lie between the third wavelength range and 800 nm. Additionally or alternatively, the fourth wavelength range can lie between 410 nm and the limit wavelength.

In accordance with an exemplary embodiment of the second filter set, the transmission of the second partial characteristic within an eighth wavelength range, which lies outside the second wavelength range but within the ninth wavelength range, is less than the fourth value. The very low transmission within the eighth wavelength range of the second partial characteristic blocks light which would swamp fluorescent light from PPIX if it were directed onto the object and reflected by the latter. The high transmission in the observation light filter in the ninth wavelength range, which comprises the eighth wavelength range, makes it possible to observe the fluorescent light from PPIX. Moreover, the low transmission in the eighth wavelength range of the illumination light filter is also relevant to achieving an observation of non-fluorescent object regions with color fidelity because the illumination light filter limits the second wavelength range and the associated significant transmission of the illumination light filter in the second wavelength range.

The exemplary embodiments described below relate both to the first filter set and to the second filter set and are not explained individually merely for the sake of compact disclosure.

In accordance with an exemplary embodiment, the transmission of the first partial characteristic of the illumination light filter within a seventh wavelength range, which lies within the first wavelength range but outside the fourth wavelength range, is greater than the first value. Within the seventh wavelength range, the transmission of the fourth partial characteristic of the observation light filter is less than the fourth value. The high transmission in the illumination light filter within the seventh wavelength range makes it possible to excite the fluorescence of PPIX with excitation light. The very low transmission in the observation light filter within the seventh wavelength range substantially blocks this excitation light, such that the light which passes through the observation light filter in the third and fourth wavelength ranges is not swamped by the excitation light. Moreover, the low transmission in the seventh wavelength range of the observation light filter is also relevant to achieving an observation of non-fluorescent object regions with color fidelity because the observation light filter limits the fourth wavelength range and the associated significant transmission of the observation light filter in the fourth wavelength range.

As an alternative to the abovementioned numerical values for the transmission characteristics for the fluorescent dye PPIX, it is possible to use the following values: The limit wavelength lies between 480 nm and 520 nm. The first wavelength range lies between 380 nm and 480 nm, in particular between 390 nm and 450 nm. The second wavelength range lies between the limit wavelength and 620 nm, in particular between 520 nm and 620 nm. The third wavelength range lies between 520 nm and 760 nm. The fourth wavelength range lies between 410 nm and 450 nm, in particular between 410 nm and 435 nm. In other words, the first wavelength can be greater than or equal to 380 nm or 390 nm; the second wavelength can be less than or equal to 480 nm or 450 nm; the third wavelength can be greater than or equal to the limit wavelength or the third wavelength can be greater than or equal to 520 nm; the fourth wavelength can be less than or equal to 620 nm; the fifth wavelength can be greater than or equal to 520 nm; the sixth wavelength can be less than or equal to 760 nm; the seventh wavelength can be greater than or equal to 410 nm; and the eighth wavelength can be less than or equal to 450 nm or 435 nm. The ninth wavelength range lies between 610 nm and 750 nm, in particular between 660 nm and 750 nm.

In accordance with exemplary embodiments, the first wavelength range has a width of at least 40 nm or at least 60 nm; and/or the second wavelength range has a width of at least 50 nm or at least 70 nm or at least 90 nm; and/or the third wavelength range has a width of at least 50 nm or at least 75 nm or at least 100 nm or at least 150 nm or at least 200 nm or at least 230 nm; and/or the fourth wavelength range has a width of at least 10 nm or at least 20 nm or at least 40 nm. The specified width denotes the difference between the second and first wavelengths for the first wavelength range, the difference between the fourth and third wavelengths for the second wavelength range, the difference between the sixth and fifth wavelengths for the third wavelength range, and the difference between the eighth and seventh wavelengths for the fourth wavelength range.

The first and fourth wavelength ranges overlap one another. In particular, the first wavelength range can comprise the fourth wavelength range. Accordingly, the fourth wavelength range can lie to its full extent within the first wavelength range. The overlapping or comprising to the full extent ensures that a wavelength range, namely the intersection of the first and fourth wavelength ranges, exists within which light is transmitted significantly by the illumination light filter and the observation light filter. Consequently, non-fluorescent object regions can be made visible.

Furthermore, the second wavelength range and the third wavelength range overlap one another. In particular, the third wavelength range can comprise the second wavelength range. Accordingly, the second wavelength range can lie to its full extent within the third wavelength range. The overlapping or comprising to the full extent ensures that a wavelength range, namely the intersection of the second and third wavelength ranges, exists within which light is transmitted significantly by the illumination light filter and the observation light filter. Consequently, non-fluorescent object regions can be made visible. What is achieved by means of the at least two intersections that are spectrally separate from one another is that non-fluorescent object regions can be observed substantially with color fidelity, i.e., in a white-light-like manner.

In accordance with exemplary embodiments, the first value is 50%, 70%, or 90%; and/or the second value is 10%, 5%, or 1%; and/or the third value is 0.01%, 0.05%, or 0.1%; and/or the fourth value is 0.005% or 0.001%, or 0.0001%.

In accordance with exemplary embodiments, the illumination light filter and the observation light filter are configured such that a ratio of a first average value to a second average value lies between 0.5 and 1.5, in particular between 0.8 and 1.2. The first average value is defined as the product of the transmission of the illumination light filter with the transmission of the observation light filter and with a wavelength-dependent factor G ($\lambda$), averaged over the intersection between the first wavelength range and the fourth wavelength range and normalized to the intersection. The second average value is defined as the product of the transmission of the illumination light filter with the transmission of the observation light filter and with the wavelength-dependent factor G ($\lambda$), averaged over the intersection between the second wavelength range and the third wavelength range and normalized to the intersection. What is brought about as a result is that transmissions within the wavelength ranges provided for visualizing non-fluorescent object regions in the illumination light filter and the observation light filter are chosen such that the non-fluorescent object regions can be observed substantially with color fidelity.

The first average value M1 is defined for example as:

$$M1 = \frac{1}{|S1 - S2|} \int_{S1}^{S2} T^I(\lambda) \cdot T^O(\lambda) \cdot G(\lambda) d\lambda,$$

wherein S1 is the smallest value of the intersection from the first and fourth wavelength ranges, wherein S2 is the largest value of the intersection from the first and fourth wavelength ranges, wherein $T^I(\lambda)$ is the wavelength-dependent transmission of the illumination light filter, wherein $T^O(\lambda)$ is the wavelength-dependent transmission of the observation light filter, and wherein || represents the absolute value.

The second average value M2 is defined for example as:

$$M2 = \frac{1}{|S3 - S4|} \int_{S3}^{S4} T^I(\lambda) \cdot T^O(\lambda) \cdot G(\lambda) d\lambda,$$

wherein S3 is the smallest value of the intersection from the second and third wavelength ranges, wherein S4 is the largest value of the intersection from the second and third wavelength ranges, wherein $T^I(\lambda)$ is the wavelength-dependent transmission of the illumination light filter, wherein $T^O(\lambda)$ is the wavelength-dependent transmission of the observation light filter, and wherein || represents the absolute value.

Accordingly, the above condition can be formulated as:

$$0.5 \leq \frac{M1}{M2} \leq 1.5 \text{ or } 0.8 \leq \frac{M1}{M2} \leq 1.2.$$

With the wavelength-dependent factor G($\lambda$), further relevant factors can be taken into account, wherein the factor can also be equal to 1 in the simplest case.

The factor G($\lambda$) can be for example the relative spectral luminous efficiency of the eye V($\lambda$), defined in accordance with CIE (Commission Internationale de l'Éclairage) 018.2-1983. This takes account of the brightness perception of the human eye in the spectral configuration for the observation of non-fluorescent object regions, which improves the color fidelity during the observation of these regions.

The factor G($\lambda$) can furthermore or alternatively take account of the power spectrum of a light source L($\lambda$) used for fluorescence observation as a factor. Accordingly, the following can hold true: G($\lambda$)=V($\lambda$) or G($\lambda$)=L($\lambda$)·V($\lambda$). By way of example, a xenon lamp or some other broadband light source can be used as the light source.

In accordance with exemplary embodiments, the fifth wavelength range, which lies between the first and second wavelength ranges and in which the transmission of the illumination light filter is less than the fourth value, comprises the limit wavelength. The fifth wavelength range can have a width of at least 20 nm, at least 40 nm, or at least 60 nm. The specified width denotes the difference between the tenth and ninth wavelengths.

In accordance with exemplary embodiments, the sixth wavelength range, which lies between the third and fourth wavelength ranges and in which the transmission of the observation light filter is less than the fourth value, comprises the limit wavelength. The sixth wavelength range can have a width of at least 20 nm, at least 40 nm or at least 60 nm. The specified width denotes the difference between the twelfth and eleventh wavelengths.

A further aspect of the disclosure relates to a fluorescence observation system for simultaneously observing protoporphyrin IX and a white-light-like image of an object. The fluorescence observation system comprises a light source for illuminating the object, an observation optical unit for imaging the object, and a filter set as described herein, wherein the illumination filter of the filter set is arrangeable/arranged in an illumination beam path between the light source and the object, and the observation light filter is arrangeable/arranged in a beam path of the observation optical unit.

A further aspect of the disclosure relates to a method for simultaneously observing protoporphyrin IX and a white-light-like image of an object. A filter set as described herein is used in the method. The method comprises: filtering an illumination light beam, which is directed onto the object enriched with protoporphyrin IX, with the illumination filter of the filter set, and filtering the light emanating from the object with the observation filter of the filter set.

BRIEF DESCRIPTION OF THE DRAWINGS

The disclosure will now be described with reference to the drawings wherein.

DESCRIPTION OF EXEMPLARY EMBODIMENTS

An exemplary embodiment of a fluorescence observation system is explained below on the basis of a surgical microscope. However, exemplary embodiments of the fluorescence observation system are not restricted to such surgical microscopes, but rather encompass any fluorescence observation systems in which illumination light directed onto an object is filtered by an illumination light filter and light emanating from the object is filtered by an observation light filter.

Figure 1:
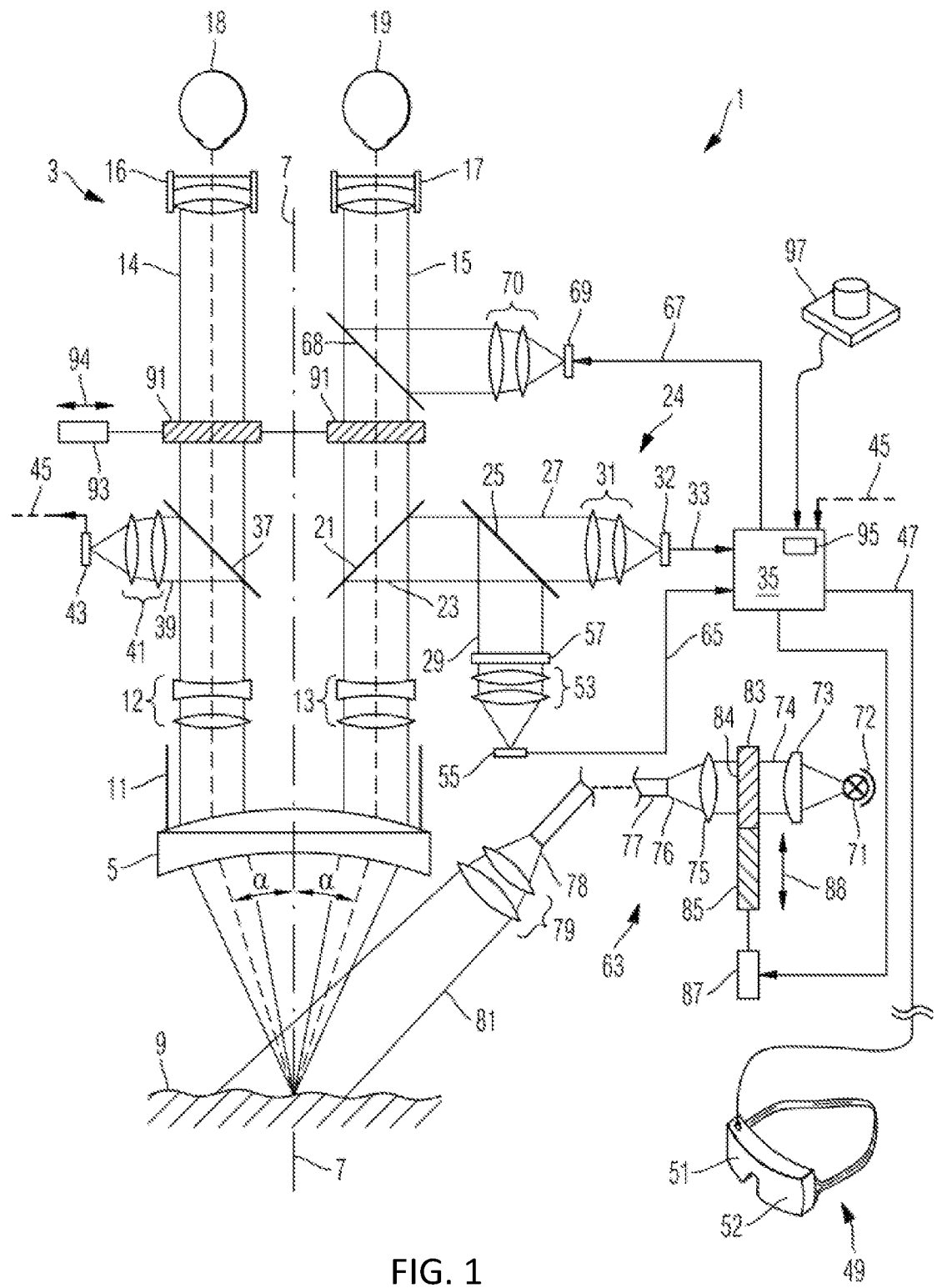
FIG. 1 shows a fluorescence observation system in accordance with an exemplary embodiment of the disclosure.

Referring to FIG. 1, the fluorescence observation system or microscope 1 comprises a microscopy optical unit 3 having an objective 5 with an optical axis 7. An object 9 to be examined is arranged in an object plane of the objective 5. Light emanating from the object 9 is transferred by the objective 5 into an image-side beam bundle 11, in which two zoom systems 12 and 13 arranged at a distance from the optical axis 7 are arranged and each extract a partial beam bundle 14 and 15, respectively, from the beam bundle 11 and feed it via deflection prisms (not illustrated in FIG. 1) to eyepieces 16 and 17, into which an observer looks with the latter's left eye 18 and the latter's right eye 19, respectively, to perceive a magnified representation of the object 9 as an image. Alternatively, cameras can be provided instead of that, the cameras generating images of the partial beam bundles 14 and 15 by means of camera optical units.

A partly transmissive mirror 21 can be arranged in the partial beam bundle 15 to couple out a part of the light as beam 23, which is fed to a camera system 24. The camera system 24 can comprise one camera or a plurality of cameras. In the exemplary embodiment illustrated, the camera system 24 comprises a camera 32, to which light of the beam 23 which penetrates through a partly transmissive mirror 25 is fed via a camera adapter optical unit 31, and a camera 55, to which light of the beam 23 which is reflected at the partly transmissive mirror 25 is fed via a filter 57 and a camera adapter optical unit 53. The filter 57 can be a fluorescent light filter, which allows to pass through only fluorescent light of a fluorescent dye contained in the object 9. Consequently, the camera 32 can detect a normal light image of the object 9, while the camera 55 can detect a fluorescent light image of the object 9. Images of the cameras 32 and 55 are transmitted via data connections 33 and 65, respectively, to a controller 35 and can be stored in the latter in a memory 95.

In a similar manner, a partly transmissive mirror 37 can be arranged in the other partial beam bundle 14, via which partly transmissive mirror a partial beam 39 is coupled out and fed via a camera adapter optical unit 41 to a camera 43, which can likewise detect a normal light image, wherein the detected images thereof are transmitted to the controller 35 via a data connection 45.

A display 69 is connected to the controller 35 via a data connection 67, the represented image of the display being coupled into the beam path to the eyepiece 17 via a projection optical unit 70 and a further partly transmissive mirror 68 arranged in the partial beam bundle 15, such that the observer can directly perceive by the latter's eye 19 both the image represented on the display 69 and the image of the object. Consequently, the controller 35 can superimpose for example data into the eyepiece 17, or images of the object which can be detected by the cameras 32, 55, and 43 or can be generated by analysis of the detected images.

The images detected by the cameras can also be output by the controller 35 to a head mounted viewing device 49, also referred to as "head mounted display," for which purpose the device 49 comprises two displays 51, 52 for the observer's right eye and left eye, respectively.

The microscope 1 furthermore comprises an illumination system 63 for generating an illumination light beam 81 directed onto the object 9. For this purpose, the illumination system 63 comprises a broadband light source, such as, for example, a halogen lamp or a xenon lamp 71, a reflector 72 and a collimator 73 to generate a collimated light beam 74, which can be directed onto an entrance end 76 of an optical fiber bundle 77 by means of one or more lenses 75 to couple light emitted by the lamp 71 into the optical fiber bundle 77. By means of the optical fiber bundle 77, the light is transported into the vicinity of the object 9, emerges there at an exit end 78 of the optical fiber bundle 77, and is then collimated by a collimation optical unit 79 to form the illumination light beam 81 directed onto the object 9.

The illumination system 63 furthermore comprises a filter plate 83 having an illumination light filter 84 for fluorescence observation and an illumination light filter 85 for normal light observation. A drive 87 controlled by the controller 35 is provided to optionally arrange the illumination light filter 84 for fluorescent light observation and the illumination light filter 85 for normal light observation in the beam 74, as is indicated by the arrow 88. The illumination light filter 84 for fluorescence observation is arranged in the beam 74 if fluorescence is intended to be excited in the object 9 and observed, while the illumination light filter 85 for normal light observation is arranged in the beam 74 if the object 9 is intended to be observed under exposure with normal light, such as white light, for example. In this case, the illumination light filter 85 can be configured for example such that it does not allow to pass through infrared light generated by the lamp 71 or light of long wavelength close to infrared light, to avoid unnecessary heating of the object 9, and allows light of shorter wavelengths to pass through.

The optional arrangement of the two illumination light filters 84 and 85 in the beam 74 can be controlled by the observer via an input device connected to the controller 35, such as a pushbutton switch 97, for example.

A respective observation light filter 91 for fluorescence observation is arranged in the beam path of the partial beam bundle 14 and 15, wherein a drive 93 likewise controlled by the controller 35 is provided to remove the observation light filters 91 from the partial beam bundles 14 and 15, as is indicated by the arrow 94.

The observation light filters 91 are arranged in the beam paths 14 and 15 if the illumination light filter 84 for fluorescence observation is arranged in the beam 74, and they are removed from the beam paths 14 and 15 if the observation light filter 91 for normal light observation is arranged in the beam 74. For this purpose, the drive 93 can be driven together with the drive 87 by the controller 35 after actuation of the input device 97 by the observer.

In the exemplary embodiment illustrated, the illumination light filter 84 for fluorescence observation and the observation light filters 91 for fluorescence image observation are introduced into the beam paths and removed from the latter by drives under the control of a controller. It is likewise possible, however, for the filters to be provided in filter holders, which are actuated by the observer directly by hand to introduce them into the beam paths and to remove them from the latter.

The illumination light filter and the observation light filter for fluorescence observation each have transmission characteristics coordinated with a fluorescent dye whose fluorescence is intended to be examined. Properties of a first filter set for protoporphyrin IX are described below with reference to FIGS. 2A to 2D. Properties of a second filter set for protoporphyrin IX are described below with reference to FIGS. 3A to 3D.

Figure 2A:
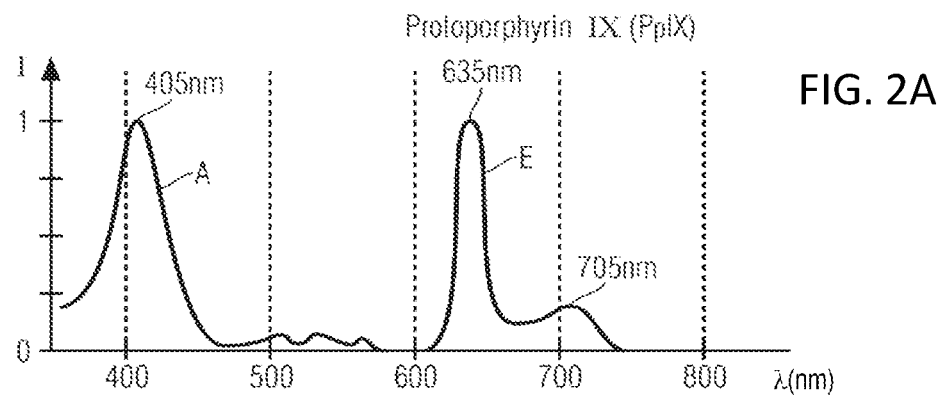
FIG. 2A shows the excitation spectrum and the emission spectrum of PPIX.

FIG. 2A shows a graph A representing the excitation spectrum of PPIX, and a graph E representing the emission spectrum of PPIX, in each case in a normalized illustration. The maximum of the excitation spectrum A is approximately 405 nm and the maximum of the emission spectrum E is approximately 635 nm. The emission spectrum E has a secondary maximum at approximately 705 nm.

Figure 2B:
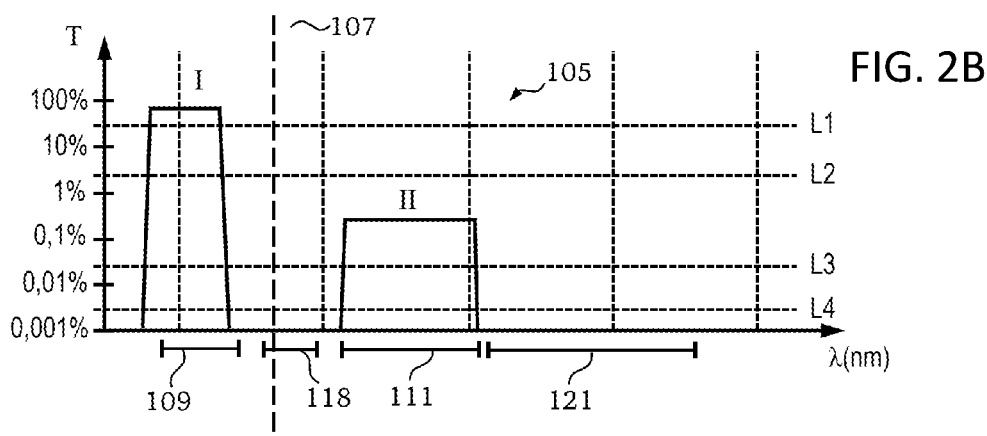
FIG. 2B shows the transmission characteristic of a first exemplary embodiment of an illumination light filter in a wavelength range of from approximately 350 nm to approximately 850 nm.

FIG. 2B shows a graph of a transmission characteristic 105 of the illumination light filter on a logarithmic scale of the ordinate in a wavelength range of from approximately 350 nm to approximately 850 nm. This comprises the visible wavelength range relevant to the observation of the properties of the filter set. FIG. 2B depicts a limit wavelength 107, which is chosen in the example illustrated such that it lies between the maximum of the excitation spectrum A and the maximum of the emission spectrum E. In the present example, the limit wavelength is approximately 480 nm.

The transmission characteristic 105 of the illumination light filter is the sum of two partial characteristics I and II defined in the entire range from 350 nm to 850 nm. At wavelengths below the limit wavelength 107, the partial characteristic I has a first wavelength range 109, within which the transmission is greater than a first value L1. That means that the transmission of the illumination light filter in the entire first wavelength range 109 is greater than the first value L1. The value L1 therefore represents a minimum value for the transmission of the illumination light filter in the first wavelength range 109. The partial characteristic I is provided to allow fluorescence excitation light to pass through the illumination light filter to excite the fluorescence of PPIX. Therefore, the first wavelength range 109 is chosen such that the excitation spectrum A of PPIX has significant values within this wavelength range. The excitation is intended to be carried out as effectively as possible, for which reason the transmission of the filter in the wavelength range 109 is chosen to be as high as possible. In this case, the value L1 represents a transmission value which is attained for example if the filter is optimized with regard to the highest possible transmission in the relevant wavelength range. In the present example, the first value L1 is approximately 50%.

At wavelengths above the limit wavelength 107, the partial characteristic II has a second wavelength range 111, within which the transmission is less than a second value L2 and greater than a third value L3. That means that the transmission of the illumination light filter in the entire second wavelength range 111 is less than the second value L2 and greater than the third value L3. Accordingly, the second value L2 is a maximum value for the transmission of the illumination light filter in the second wavelength range 111; and the third value L3 is a minimum value for the transmission of the illumination light filter in the second wavelength range 111. The partial characteristic II has the task of allowing to pass through the illumination light filter light which does not serve for the excitation of fluorescence, but rather for the illumination of the object in such a way that the non-fluorescent regions thereof become perceptible. The second wavelength range 111 is therefore chosen such that it lies outside those wavelength ranges in which the emission spectrum E has significant values. Since the non-fluorescent regions are intended not to swamp the fluorescent regions in perception and the fluorescence usually has a low intensity, the illumination light is transmitted by the illumination light filter with comparatively low intensity on account of the partial characteristic II. Therefore, the value L2 is less than the value L1. In the example illustrated, the second value L2 is approximately 5%. However, the transmission provided by the partial characteristic II is greater than the third value L3, which is in turn significantly greater than a fourth value L4. In the present example, the third value is approximately 0.05% and the fourth value L4 is approximately 0.005%.

Figure 2C:
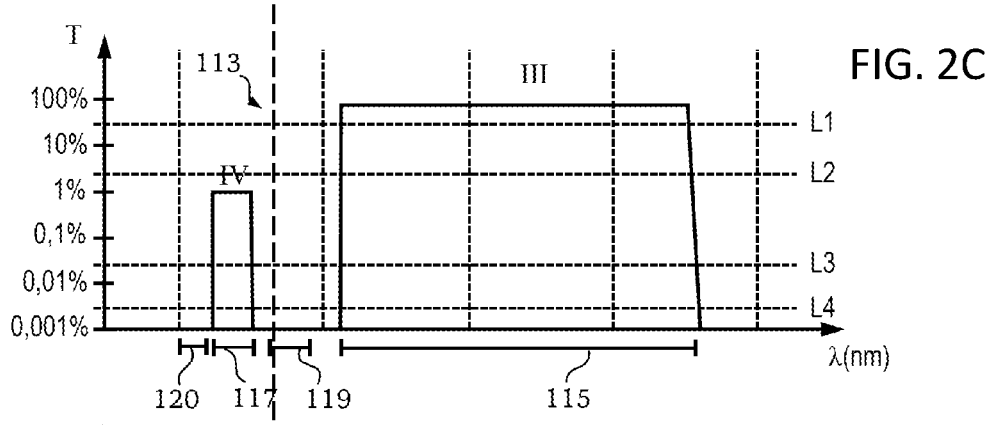
FIG. 2C shows the sixth wavelength range of a first exemplary embodiment of an observation light filter.

A transmission characteristic 113 of the observation light filter is illustrated in FIG. 2C. The transmission characteristic 113 is in turn the sum of two partial characteristics III and IV. At wavelengths above the limit wavelength 107, the partial characteristic III has a third wavelength range 115, within which the transmission is greater than the first value L1. The first value L1 is thus a minimum value for the transmission of the observation light filter within the third wavelength range 115. The partial characteristic III has the task of allowing to pass through the observation light filter both fluorescent light (between approximately 610 nm and 740 nm) and such illumination light which reaches the object on account of the partial characteristic II of the illumination light filter (second wavelength range 111). Therefore, it is possible firstly to perceive fluorescent regions, since the fluorescent light can penetrate through the observation light filter on account of the partial characteristic III, and it is also possible to perceive non-fluorescent regions of the object, since the light which reached the object on account of the partial characteristic II and which is not fluorescence excitation light can penetrate the observation light filter.

At wavelengths below the limit wavelength 107, the partial characteristic IV has a fourth wavelength range 117, within which the transmission is less than the second value L2 and greater than the third value L3. The second value L2 is therefore a maximum value for the transmission of the observation light filter within the fourth wavelength range 117; and the third value L3 is a minimum value for the transmission of the observation light filter within the fourth wavelength range 117. The partial characteristic IV has the task of allowing to pass through the observation light filter at least part of the light which reaches the object on account of the partial characteristic I of the illumination light filter and is reflected at or scattered by the object, to make visible non-fluorescent regions of the object. In a manner similar to the partial characteristic II of the illumination light filter, the partial characteristic IV of the observation light filter also has a restricted transmission of at most the second value L2 to avoid swamping of the fluorescent regions by the non-fluorescent regions. In order that a sufficient light intensity can pass through the observation filter, the transmission within the fourth wavelength range is at least the third value L3, which is significantly greater than the value L4 present in such regions of the transmission characteristic 113 in which the passage of light is intended to be blocked by the observation light filter.

As shown in FIG. 2B, the illumination light filter has a fifth wavelength range 118. The fifth wavelength range 118 lies between the first wavelength range 109 and the second wavelength range 111. Within the fifth wavelength range 118 the transmission of the illumination light filter is less than the fourth value L4. The fifth wavelength range serves for spectrally separating the first and second wavelength ranges. As shown in FIG. 2B, the fifth wavelength range can comprise the limit wavelength 107.

As shown in FIG. 2C, the observation light filter has a sixth wavelength range 119. The sixth wavelength range 119 lies between the third wavelength range 115 and the fourth wavelength range 117. Within the sixth wavelength range 119 the transmission of the observation light filter is less than the fourth value L4. The sixth wavelength range serves for spectrally separating the third and fourth wavelength ranges. As shown in FIG. 2C, the sixth wavelength range can comprise the limit wavelength 107.

As shown in FIGS. 2B and 2C, the illumination light filter and the observation light filter have a seventh wavelength range 120. The seventh wavelength range 120 lies within the first wavelength range 109, but outside the fourth wavelength range 117. In the first partial characteristic I of the illumination light filter, the transmission within the seventh wavelength range 120 is at least the first value L1. In the fourth partial characteristic IV of the observation light filter, the transmission within the seventh wavelength range 120 is at most the fourth value L4. Light in the seventh wavelength range that is suitable for the excitation of PPIX can pass through the illumination light filter, but is blocked by the observation light filter, such that this excitation light does not swamp the light in the third wavelength range 115 and in the fourth wavelength range 117.

As shown in FIGS. 2B and 2C, the illumination light filter and the observation light filter have an eighth wavelength range 121. The eighth wavelength range 121 lies within the third wavelength range 115, but outside the second wavelength range 111. In the third partial characteristic III of the observation light filter, the transmission within the eighth wavelength range 121 is at least the first value L1. In the second partial characteristic II of the illumination light filter, the transmission within the eighth wavelength range 121 is at most the fourth value L4. Light in the eighth wavelength range substantially comprises the fluorescent light from PPIX. In order that the light is not swamped by the illumination light, the illumination light filter blocks light in the eighth wavelength range 121, while the observation light filter transmits light in the eighth wavelength range 121 to thus be able to observe the fluorescent light.

Figure 2D:
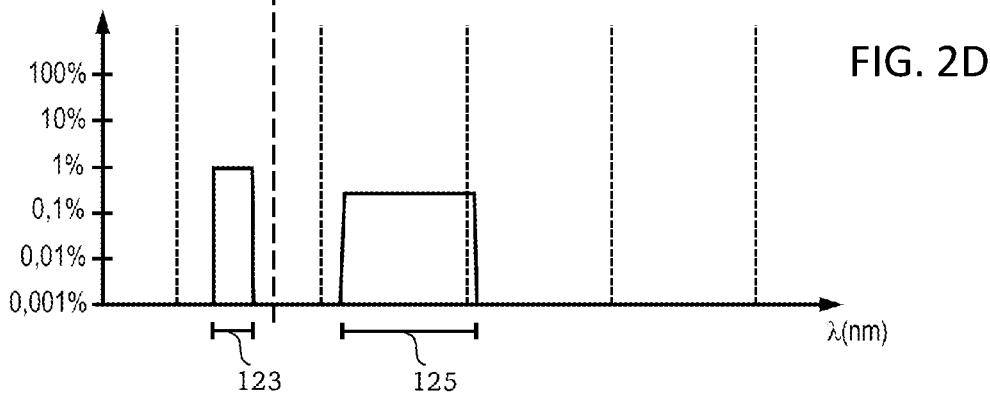
FIG. 2D shows the product of the transmission characteristic of the illumination light filter and the transmission characteristic of the observation light filter of a first exemplary embodiment.

FIG. 2D shows the product of the transmission characteristic 105 of the illumination light filter and the transmission characteristic 113 of the observation light filter. This product exhibits significant values in two regions, namely in an intersection 123 between the first wavelength range 109 and the fourth wavelength range 117 and in an intersection 125 between the third wavelength range 115 and the second wavelength range 111. The two intersections 123 and 125 are wavelength ranges outside the fluorescence from PPIX. The high values within the intersections 123 and 125 therefore contribute to the visualization of non-fluorescent object regions. In this way, in addition to fluorescent object regions that appear in the color of the fluorescent dye, at the same time non-fluorescent object regions can also be observed substantially with color fidelity.

An exemplary second filter set for protoporphyrin IX is described below with reference to FIGS. 3A to 3D.

Figure 3A:
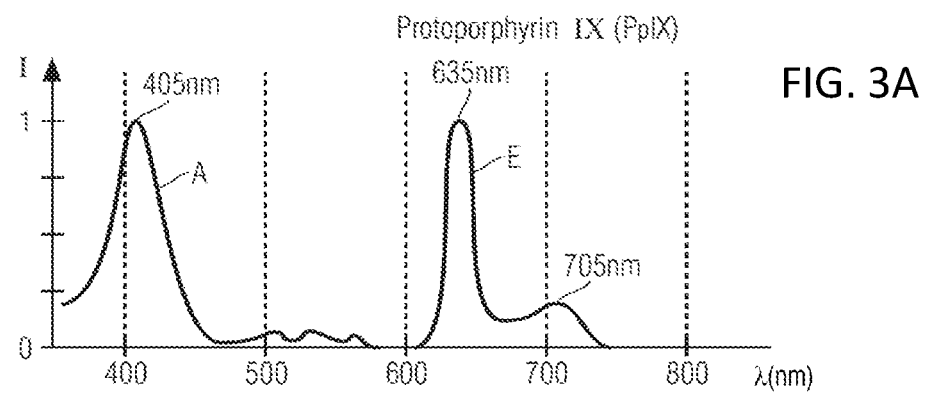
FIG. 3A corresponds to FIG. 2A.

FIG. 3A corresponds to FIG. 2A. Reference is made to the description thereof.

Figure 3B:
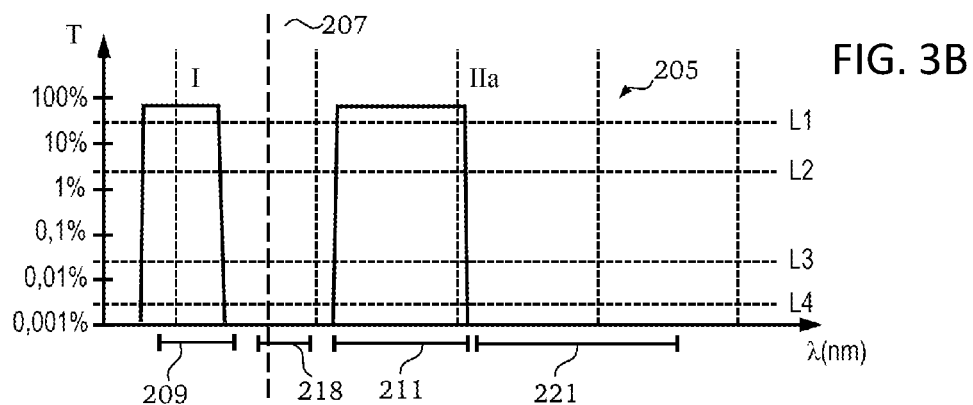
FIG. 3B shows the transmission characteristic of a second exemplary embodiment of an illumination light filter in a wavelength range of from approximately 350 nm to approximately 850 nm.

FIG. 3B shows a graph of a transmission characteristic 205 of the illumination light filter on a logarithmic scale of the ordinate in a wavelength range of from approximately 350 nm to approximately 850 nm. This comprises the visible wavelength range that is relevant to the observation of the properties of the filter set. FIG. 3B depicts a limit wavelength 207, which substantially corresponds to the limit wavelength 107 such as has been described in association with FIGS. 2B to 2D.

The transmission characteristic 205 of the illumination light filter is the sum of two partial characteristics I and IIa defined in the entire range of from 350 nm to 850 nm. The partial characteristic I of the second filter set substantially corresponds to the partial characteristic I of the first filter set such as has been described in association with FIGS. 2B to 2D. Accordingly, at wavelengths below the limit wavelength 207, it has a first wavelength range 209, within which the transmission is greater than a first value L1.

The partial characteristic IIa of the second filter set differs from the partial characteristic II of the first filter set substantially only in that the transmission within a second wavelength range 211, which lies above the limit wavelength 207, is greater than the first value L1. That means that the transmission of the illumination light filter in the entire second wavelength range 211 is greater than the first value L1. Accordingly, the first value L1 is a minimum value for the transmission of the illumination light filter in the second wavelength range 211. The partial characteristic II has the task of allowing to pass through the illumination light filter light which does not serve for the excitation of fluorescence, but rather serves for the illumination of the object in such a way that the non-fluorescent regions thereof become perceptible. The second wavelength range 211 is therefore chosen such that it lies outside those wavelength ranges in which the emission spectrum E has significant values. Since the non-fluorescent regions are intended not to swamp the fluorescent regions in perception and the fluorescence usually has a low intensity, the observation light filter described below has in the second wavelength range 211 a significantly lower transmission compared with the first value L1.

Figure 3C:
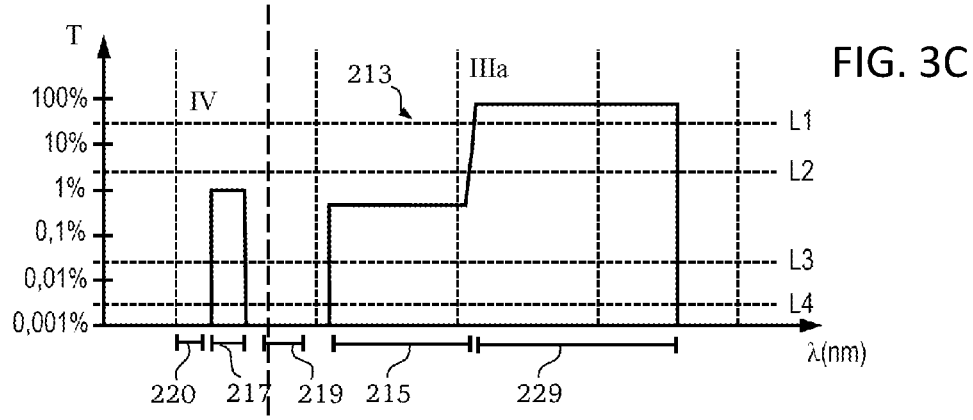
FIG. 3C shows the sixth wavelength range of a second exemplary embodiment of an observation light filter.

A transmission characteristic 213 of the observation light filter is illustrated in FIG. 3C. The transmission characteristic 213 is in turn the sum of two partial characteristics IIIa and IV. The third partial characteristic IIIa of the second filter set differs significantly from that of the first filter set.

At wavelengths above the limit wavelength 207, the partial characteristic IIIa has a third wavelength range 215, within which the transmission is less than the second value L2 and greater than the third value L3. The second value is therefore a maximum value for the transmission of the observation light filter within the third wavelength range 215; and the third value L3 is a minimum value for the transmission of the observation light filter within the third wavelength range 215.

Furthermore, the partial characteristic IIIa above the third wavelength range 215 has a ninth wavelength range extending from approximately 610 nm to 750 nm. Within the ninth wavelength range, the transmission of the observation light filter is greater than the first value L1. As a result, the fluorescent light from PPIX can pass through the observation filter and be observed.

The partial characteristic III has the task of allowing to pass through the observation light filter both fluorescent light (between approximately 610 nm and 740 nm) and such illumination light which reaches the object on account of the partial characteristic II of the illumination light filter (second wavelength range 211). Therefore, it is possible firstly to perceive fluorescent regions since the fluorescent light can penetrate through the observation light filter on account of the partial characteristic III, and it is also possible to perceive non-fluorescent regions of the object since the light which reached the object on account of the partial characteristic II and which is not fluorescence excitation light can penetrate through the observation light filter in the third wavelength range 215.

The fourth partial characteristic IV of the second filter set substantially corresponds to the fourth partial characteristic IV of the first filter set. Accordingly, at wavelengths below the limit wavelength 207, it has a fourth wavelength range 217, within which the transmission is less than the second value L2 and is greater than the third value L3. The second value L2 is therefore a maximum value for the transmission of the observation light filter within the fourth wavelength range 217; and the third value L3 is a minimum value for the transmission of the observation light filter within the fourth wavelength range 217.

As shown in FIG. 3B, the illumination light filter has a fifth wavelength range 218. The fifth wavelength range 218 lies between the first wavelength range 209 and the second wavelength range 211. Within the fifth wavelength range 218, the transmission of the illumination light filter is less than the fourth value L4. The fifth wavelength range serves for spectrally separating the first and second wavelength ranges. As shown in FIG. 3B, the fifth wavelength range can comprise the limit wavelength 207.

As shown in FIG. 3C, the observation light filter has a sixth wavelength range 219. The sixth wavelength range 219 lies between the third wavelength range 215 and the fourth wavelength range 217. Within the sixth wavelength range 219, the transmission of the observation light filter is less than the fourth value L4. The sixth wavelength range serves for spectrally separating the third and fourth wavelength ranges. As shown in FIG. 3C, the sixth wavelength range can comprise the limit wavelength 207.

As shown in FIGS. 3B and 3C, the illumination light filter and the observation light filter have a seventh wavelength range 220. The seventh wavelength range 220 lies within the first wavelength range 209, but outside the fourth wavelength range 217. In the first partial characteristic I of the illumination light filter, the transmission within the seventh wavelength range 220 is at least the first value L1. In the fourth partial characteristic IV of the observation light filter, the transmission within the seventh wavelength range 220 is at most the fourth value L4. Light in the seventh wavelength range that is suitable for the excitation of PPIX can pass through the illumination light filter, but is blocked by the observation light filter, such that this excitation light does not swamp the light in the third wavelength range 215 and in the fourth wavelength range 217.

As shown in FIGS. 3B and 3C, the illumination light filter and the observation light filter have an eighth wavelength range 221. The eighth wavelength range 221 lies above the second wavelength range 211 and can be comprised by the ninth wavelength range 229. In the second partial characteristic IIa of the illumination light filter, the transmission within the eighth wavelength range 221 is at most the fourth value L4. Light in the eighth wavelength range substantially comprises the fluorescent light from PPIX. In order that the latter is not swamped by the illumination light, the illumination light filter blocks light in the eighth wavelength range 221, while the observation light filter transmits light in the eighth wavelength range 221, to thus be able to observe the fluorescent light.

Figure 3D:
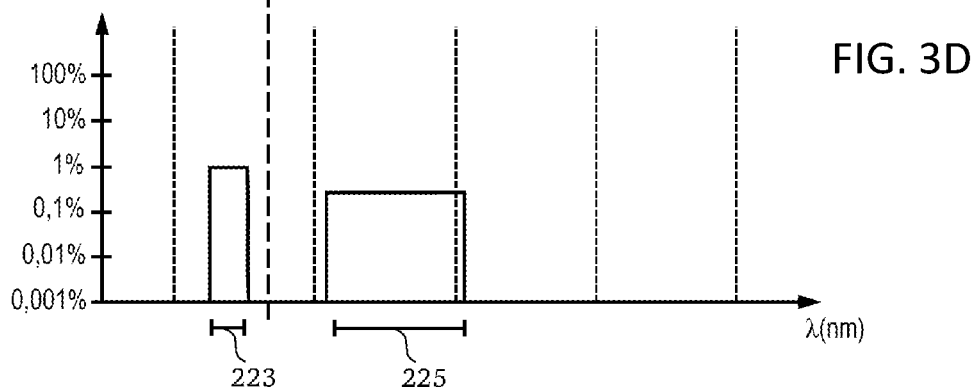
FIG. 3D shows the product of the transmission characteristic of the illumination light filter and the transmission characteristic of the observation light filter of a second exemplary embodiment.

FIG. 3D shows the product of the transmission characteristic 205 of the illumination light filter and the transmission characteristic 213 of the observation light filter. This product exhibits significant values in two regions, namely in an intersection 223 between the first wavelength range 209 and the fourth wavelength range 217, and in an intersection 225 between the third wavelength range 215 and the second wavelength range 211. The two intersections 223 and 225 are wavelength ranges outside the fluorescence from PPIX. The high values within the intersections 223 and 225 therefore contribute to the visualization of non-fluorescent object regions. In this way, in addition to fluorescent object regions that appear in the color of the fluorescent dye, at the same time non-fluorescent object regions can also be observed substantially with color fidelity.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A filter set, comprising:
an illumination light filter; and
an observation light filter,
wherein a transmission characteristic of the illumination light filter is a sum of a first partial characteristic and a second partial characteristic,
wherein a transmission of the first partial characteristic within a first wavelength range, which lies below a limit wavelength, is greater than a first value,
wherein a transmission of the second partial characteristic within a second wavelength range, which lies above the limit wavelength, is less than a second value and greater than a third value, wherein a transmission characteristic of the observation light filter is a sum of a third partial characteristic and a fourth partial characteristic, wherein a transmission of the third partial characteristic within a third wavelength range, which lies above the limit wavelength, is greater than the first value, wherein a transmission of the fourth partial characteristic within a fourth wavelength range, which lies below the limit wavelength, is less than the second value and greater than the third value, wherein a transmission of the illumination light filter within a fifth wavelength range, which lies between the first wavelength range and the second wavelength range, is less than a fourth value, wherein a transmission of the observation light filter within a sixth wavelength range, which lies between the third wavelength range and the fourth wavelength range, is less than the fourth value, wherein the fourth value is less than the third value, the third value is less than the second value, and the second value is less than the first value, wherein the limit wavelength lies between 450 nm and 550 nm, wherein the first wavelength range lies between 350 nm and the limit wavelength, wherein the second wavelength range lies between the limit wavelength and 620 nm and has a width of at least 50 nm, wherein the third wavelength range lies between the limit wavelength and 800 nm, and wherein the fourth wavelength range lies between 410 nm and the limit wavelength.

2. The filter set according to claim 1, wherein at least one of:
a transmission of the second partial characteristic within an eighth wavelength range, which lies outside the second wavelength range but within the third wavelength range, is less than the fourth value, or
a transmission of the third partial characteristic within the eighth wavelength range is greater than the first value.

3. The filter set according to claim 1, wherein the third wavelength range has a width of at least 150 nm.

4. The filter set according to claim 1, wherein at least one of:
a transmission of the first partial characteristic within a seventh wavelength range, which lies within the first wavelength range but outside the fourth wavelength range, is greater than the first value, or
a transmission of the fourth partial characteristic within the seventh wavelength range is less than the fourth value.

5. The filter set according to claim 1, wherein the limit wavelength lies between 480 nm and 520 nm.

6. The filter set according to claim 1, wherein at least one of:
the first wavelength range lies between 380 nm and 480 nm,
the third wavelength range lies between 520 nm and 760 nm, or
the fourth wavelength range lies between 410 nm and 450 nm.

7. The filter set according to claim 1, wherein at least one of:
the first wavelength range has a width of at least 40 nm, or
the fourth wavelength range has a width of at least 10 nm.

8. The filter set according to claim 1, wherein at least one of:
the first wavelength range and the fourth wavelength range overlap one another, or
the second wavelength range and the third wavelength range overlap one another.

9. The filter set according to claim 1, wherein at least one of:
the first wavelength range includes the fourth wavelength range, or
the third wavelength range includes the second wavelength range.

10. The filter set according to claim 1, wherein at least one of:
the first value is 50%,
the second value is 10%, or
the third value is 0.01%.

11. The filter set according to claim 1,
wherein the illumination light filter and the observation light filter are configured to have a ratio of a first average value to a second average value between 0.5 and 1.5,
wherein the first average value is a product of the transmission of the illumination light filter with the transmission of the observation light filter and with a wavelength-dependent factor, averaged over the intersection between the first wavelength range and the fourth wavelength range and normalized to the intersection, and
wherein the second average value is a product of the transmission of the illumination light filter with the transmission of the observation light filter and with a wavelength-dependent factor, averaged over the intersection between the second wavelength range and the third wavelength range and normalized to the intersection, and
wherein the wavelength-dependent factor is 1 or is the relative spectral luminous efficiency of the eye $V(\lambda)$, defined in accordance with CIE (Commission Internationale de l'Éclairage) 018.2-1983.

12. The filter set according to claim 1, wherein at least one of:
the fifth wavelength range includes the limit wavelength,
the fifth wavelength range has a width of at least 20 nm,
the sixth wavelength range includes the limit wavelength, or
the sixth wavelength range has a width of at least 20 nm.

13. A fluorescence observation system for simultaneously observing protoporphyrin IX and a white-light-like image of an object, the fluorescence observation system comprising:
a light source configured to illuminate the object;
an observation optical unit configured to image the object; and
a filter set according to claim 1,
wherein the illumination filter is arranged in an illumination beam path between the light source and the object and the observation light filter is arranged in a beam path of the observation optical unit.

14. A method for simultaneously observing protoporphyrin IX and a white-light-like image of an object with the filter set according to claim 1, the method comprising:
providing the object enriched with the protoporphyrin IX;
filtering an illumination light beam, which is directed onto the object enriched with protoporphyrin IX, with the illumination filter of the filter set; and
filtering light emanating from the object with the observation light filter of the filter set.

15. The filter set according to claim 1, wherein the third wavelength range has a width of at least 200 nm.

16. The filter set according to claim 1, wherein the third wavelength range has a width of at least 230 nm.

17. A filter set, comprising:
an illumination light filter; and
an observation light filter,
wherein a transmission characteristic of the illumination light filter is a sum of a first partial characteristic and a second partial characteristic,
wherein a transmission of the first partial characteristic within a first wavelength range, which lies below a limit wavelength, is greater than a first value,
wherein a transmission of the second partial characteristic within a second wavelength range, which lies above the limit wavelength, is greater than the first value,
wherein a transmission characteristic of the observation light filter is a sum of a third partial characteristic and a fourth partial characteristic,
wherein a transmission of the third partial characteristic within a third wavelength range, which lies above the limit wavelength, is less than a second value and greater than a third value,
wherein a transmission of the third partial characteristic within a ninth wavelength range, which lies above the third wavelength range, is greater than the first value,
wherein a transmission of the fourth partial characteristic within a fourth wavelength range, which lies below the limit wavelength, is less than the second value and greater than the third value,
wherein a transmission of the illumination light filter within a fifth wavelength range, which lies between the first wavelength range and the second wavelength range, is less than a fourth value,
wherein a transmission of the observation light filter within a sixth wavelength range, which lies between the third wavelength range and the fourth wavelength range, is less than the fourth value, and
wherein the fourth value is less than the third value, the third value is less than the second value, and the second value is less than the first value.

18. The filter set according to claim 17, wherein at least one of:
the limit wavelength lies between 450 nm and 550 nm,
the first wavelength range lies between 350 nm and the limit wavelength,
the second wavelength range lies between the limit wavelength and 680 nm,
the third wavelength range lies between the limit wavelength and 680 nm,
the ninth wavelength range lies between the third wavelength range and 800 nm, or
the fourth wavelength range lies between 410 nm and the limit wavelength.

19. The filter set according to claim 17,
wherein a transmission of the second partial characteristic within an eighth wavelength range, which lies outside the second wavelength range but within the ninth wavelength range, is less than the fourth value.

20. The filter set according to claim 17, wherein the third wavelength range has a width of at least 50 nm.

21. A filter set, comprising:
an illumination light filter; and
an observation light filter,
wherein a transmission characteristic of the illumination light filter is a sum of a first partial characteristic and a second partial characteristic,
wherein a transmission of the first partial characteristic within a first wavelength range, which lies below a limit wavelength, is greater than a first value,
wherein a transmission of the second partial characteristic within a second wavelength range, which lies above the limit wavelength, is less than a second value and greater than a third value,
wherein a transmission characteristic of the observation light filter is a sum of a third partial characteristic and a fourth partial characteristic,
wherein a transmission of the third partial characteristic within a third wavelength range, which lies above the limit wavelength, is greater than the first value,
wherein a transmission of the fourth partial characteristic within a fourth wavelength range, which lies below the limit wavelength, is less than the second value and greater than the third value,
wherein a transmission of the illumination light filter within a fifth wavelength range, which lies between the first wavelength range and the second wavelength range, is less than a fourth value of 0.005%,
wherein a transmission of the observation light filter within a sixth wavelength range, which lies between the third wavelength range and the fourth wavelength range, is less than the fourth value,
wherein the fourth value is less than the third value, the third value is less than the second value, and the second value is less than the first value,
wherein the limit wavelength lies between 450 nm and 550 nm,
wherein the first wavelength range lies between 350 nm and the limit wavelength,
wherein the second wavelength range lies between the limit wavelength and 680 nm,
wherein the third wavelength range lies between the limit wavelength and 800 nm, and
wherein the fourth wavelength range lies between 410 nm and the limit wavelength.

* * * * *